Patented July 15, 1952

2,603,619

UNITED STATES PATENT OFFICE 2,603,619

DIALKYL BISPHENOXY ACETATE PLASTICIZED POLYVINYL CHLORIDE COMPOSITIONS

Joachim Dazzi, Dayton, Ohio, assignor to Monsanto Chemical Company, St. Louis, Mo., a corporation of Delaware No Drawing. Application February 23, 1950,
Serial No. 145,889

14 Claims. (Cl. 260—31.8)

This invention relates to new plastic compositions comprising vinyl chloride and an ester of bisphenoxyacetic acid which may be represented by the following formula:

wherein R is an alkyl radical containing less than 11 carbon atoms.

Compositions based on polyvinyl chloride are among the most widely used plastic materials currently available. Polyvinyl chloride per se however is a hard, horny, brittle material which has little utility. This material is modified by the incorporation of a plasticizer to provide a large range of compositions of varying physical properties.

Vinyl chloride may be copolymerized with other monomers, as for example a small amount of vinyl acetate to also materially improve the general physical properties of the vinyl chloride resin. Copolymers of this nature, wherein the vinyl chloride is the major resin constituent, may also be further modified by the incorporation of a plasticizer. Polymer materials which can be plasticized by the dialkyl bisphenoxyacetates disclosed herein are polyvinyl chloride and copolymers of vinyl chloride wherein the vinyl chloride comprises at least about 80 per cent by weight of the resin composition and up to about 20 per cent of a copolymerizable monomer.

Many plasticizers have been recommended and are used for formulation with vinyl chloride resins. However, for various reasons none of the plasticizers available provides the optimum conditions for all physical properties. Currently the most widely used general polyvinyl chloride plasticizers are tricresyl phosphate and di-2-ethylhexyl phthalate.

Recently cresylic acid and phthalic anhydride were in short supply and plasticizers became the bottleneck of the plastics industry. This condition has now been alleviated but it points out the necessity of having a large range of suitable plasticizers available from varying sources. This would be desirable even if the new plasticizers might be somewhat inferior in certain physical properties to the currently favored plasticizers. It is of course understood that the ultimate end use of the vinyl chloride plastic will determine the essential physical properties required. Thus, for many specialty applications certain specific properties may be ignored, if unimportant for the intended application.

The object of this invention is to provide plasticized vinyl chloride compositions wherein the plasticizer is economical, compatible with the vinyl chloride composition over a wide range of proportions, and is effective over a wide range of temperature variations. Other objects will be apparent from the following disclosure.

It has now been found that compositions of polyvinyl chloride with 1 to 10 carbon atom saturated alkyl monohydric alcohol esters of bisphenoxyacetic acid provide resins which have chemical and physical characteristics which are comparable to the best general plasticizers currently employed. The ester alkyl radicals can be mixed or identical. The esters can be o,o'-; o,p'-; m,m'-; and p,p'-. However, the esters of p,p'-bisphenoxyacetic acid are preferred for their ease of preparation and the lower volatility which they impart to the polyvinyl chloride resin composition.

The plasticizer as above identified may in general be employed from about 5 up to about 45 per cent by weight of the final composition and preferably from about 20 to about 45 per cent. The polyvinyl chloride composition also nearly always has a stabilizer to protect the resin from thermal decomposition and degradation of color. In addition, fillers, coloring materials, and mold lubricants may be added as is well-known to those familiar with the art.

Mixed plasticizers may also be employed from among the above disclosed esters and suitable prior art plasticizers.

The following examples are illustrative of this invention:

Example 1

A. An alkaline solution was prepared by dissolving 88 g. (2.2 moles) of sodium hydroxide in 250 ml. of water to which 204.6 g. (1.1 moles) of 4,4'-dihydroxybiphenyl was charged and dissolved therein. Then about 150 ml. of ethanol was added thereto.

B. A second solution was prepared by dissolving 155 g. (1.45 moles) of sodium carbonate in about 450 ml. of water and then dissolving therein 274 g. (2.9 moles) of monochloroacetic acid.

Solution A was slowly added to solution B over a period of about 2 hours while maintaining mild agitation. It was necessary to maintain the sodium p,p'-biphenate at about 40 to 50° C. to prevent crystallization from taking place in the concentrated solution. Mild agitation was continued overnight at room temperature. The reaction mixture was then poured into 2 liters of water and made strongly acid by slowly adding hydrochloric acid while rapidly stirring the solution. The p,p'-bisphenoxyacetic acid was precipitated and recovered by filtration, resuspended in 3 liters of wash water and stirred for 3 hours, then again filtered. The p,p'-bisphenoxyacetic acid was then suspended in 1 liter of hot ethanol, stirred to dissolve any unreacted 4,4'-dihydroxybiphenyl present in the product, and again filtered to recover the white p,p'-bisphenoxyacetic acid which was then dried.

*Example 2*

45 g. (0.15 mole) p,p'-bisphenoxyacetic acid.
78 g. (0.60 mole) 2-ethylhexanol.
150 ml. benzene.
1 g. toluene sulfonic acid.

The mixture of the above reactants was heated under reflux and the water formed during the esterification was collected in a Dean and Stark distilling receiver. Esterification was further accelerated by the addition of 5 ml. of concentrated sulfuric acid, when the rate of water formation was found to be slow. When the esterification was complete, as measured by the cessation of water formation, the reaction mixture was cooled and a small amount of insoluble material was filtered out, then the liquid was diluted with ethyl ether, washed several times with a cold 5 per cent solution of sodium carbonate, followed by washing twice with water. The solvents were then distilled off. The di-2-ethylhexyl ester of p,p'-bisphenoxyacetic acid was further assured of being solvent free by heating to 170° C. at 1 to 2 mm. of mercury.

*Example 3*

The di-2-ethylhexyl ester of p,p'-bisphenoxyacetic acid of Example 2 was milled into a standard polyvinyl chloride composition in an amount sufficient to provide 40 per cent plasticizer on the basis of the total composition and evaluated as shown in the table.

| | TCP | DOP | EX. 3 |
|---|---|---|---|
| Low Temp. Flexibility,[1] °C | −10 | −36 | −12 |
| Shore Durometer Hardness "A" | 78 | 74 | 73 |
| Percent Volatility 24 hrs. at 105° C | 0.8 | 4.5 | 0.5 |
| Percent Water Absorption 24 hrs | 0.32 | 0.14 | 0.31 |
| Percent Water Leaching Loss 24 hrs | 0.01 | 0.02 | 0.02 |

[1] Clash and Berg method.
TCP = tricresyl phosphate.
DOP = di-2-ethylhexyl phthalate.
EX. 3 = di-2-ethylhexyl-p,p'-bisphenoxyacetate.

The plasticizer of this invention did not exhibit any fuming during milling with the polyvinyl chloride, was compatible therewith and the transparency of the molded sheet was clear.

Other suitable esters of bisphenoxyacetic acid which may be compounded with vinyl chloride resins are for example dimethyl-p,p'-bisphenoxyacetate; diethyl-p,p'-bisphenoxyacetate; dibutyl-p,p'-bisphenoxyacetate; dihexyl-p,p'-bisphenoxyacetate; and other homologous compounds wherein the alkyl group contains less than 11 carbon atoms.

I claim:

1. A plasticized vinyl chloride resin which comprises a polymer of at least about 80 per cent of vinyl chloride and up to about 20 per cent of a copolymerizable monomer, containing intimately dispersed therein an ester of bisphenoxyacetic acid having the formula

wherein R is an alkyl radical containing less than 11 carbon atoms.

2. The plasticized vinyl chloride resin composition of claim 1 wherein the ester comprises from about 20 to about 45 per cent by weight of the total composition.

3. A plasticized vinyl chloride resin which comprises a polymer of at least about 80 per cent of vinyl chloride and up to about 20 per cent of a copolymerizable monomer, containing intimately dispersed therein an ester of p,p'-bisphenoxyacetic acid having the formula

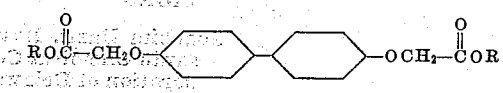

wherein R is an alkyl radical containing less than 11 carbon atoms.

4. The plasticized vinyl chloride resin composition of claim 3 wherein the ester comprises from about 20 to about 45 per cent by weight of the total composition.

5. A plasticized vinyl chloride resin which comprises a polymer of at least about 80 per cent of vinyl chloride and up to about 20 per cent of a copolymerizable monomer, containing intimately dispersed therein di-2-ethylhexyl-p,p'-bisphenoxyacetate.

6. The plasticized vinyl chloride resin composition of claim 5 wherein the ester comprises from about 20 to about 45 per cent by weight of the total composition.

7. A plasticized vinyl chloride resin which comprises a polymer of at least about 80 per cent of vinyl chloride and up to about 20 per cent of a copolymerizable monomer, containing intimately dispersed therein dimethyl-p,p'-bisphenoxyacetate.

8. The plasticized vinyl chloride resin composition of claim 7 wherein the ester comprises from about 20 to about 45 per cent by weight of the total composition.

9. A plasticized vinyl chloride resin which comprises a polymer of at least about 80 per cent of vinyl chloride and up to about 20 per cent of a copolymerizable monomer, containing intimately dispersed therein diethyl-p,p'-bisphenoxyacetate.

10. The plasticized vinyl chloride resin composition of claim 9 wherein the ester comprises from about 20 to about 45 per cent by weight of the total composition.

11. A plasticized vinyl chloride resin which comprises a polymer of at least about 80 per cent of vinyl chloride and up to about 20 per cent of a copolymerizable monomer, containing intimately dispersed therein dibutyl-p,p'-bisphenoxyacetate.

12. The plasticized vinyl chloride resin composition of claim 11 wherein the ester comprises from about 20 to about 45 per cent by weight of the total composition.

13. A plasticized vinyl chloride resin which comprises a polymer of at least about 80 per cent of vinyl chloride and up to about 20 per cent of a copolymerizable monomer, containing intimately dispersed therein dihexyl-p,p'-bisphenoxyacetate.

14. The plasticized vinyl chloride resin composition of claim 13 wherein the ester comprises from about 20 to about 45 per cent by weight of the total composition.

JOACHIM DAZZI.

REFERENCES CITED

The following references are of record in the file of this patent:

UNITED STATES PATENTS

| Number | Name | Date |
|---|---|---|
| 2,498,602 | Dazzi | Feb. 21, 1950 |